United States Patent [19]

Abdoo

[11] Patent Number: 5,511,170
[45] Date of Patent: Apr. 23, 1996

[54] DIGITAL BUS DATA RETENTION

[75] Inventor: David G. Abdoo, Fountain Hills, Ariz.

[73] Assignee: Motorola, Inc., Schaumburg, Ill.

[21] Appl. No.: 100,815

[22] Filed: Aug. 2, 1993

[51] Int. Cl.[6] ................................................ H01J 13/00
[52] U.S. Cl. .................................................... 395/280
[58] Field of Search ............................. 395/325, 280, 395/306; 364/DIG. 1, DIG. 2; 326/86, 41, 90, 104, 93; 327/141

[56] References Cited

U.S. PATENT DOCUMENTS

| | | | |
|---|---|---|---|
| 4,298,982 | 11/1981 | Auerbach | 371/30 |
| 4,320,452 | 3/1982 | Kempf et al. | 395/325 |
| 4,774,422 | 9/1988 | Donaldson et al. | 307/475 |
| 4,801,813 | 1/1989 | Kersenbrock | 307/40 |
| 5,007,012 | 4/1991 | Dujari | 395/425 |
| 5,230,067 | 7/1993 | Buch | 395/275 |

*Primary Examiner*—Jack B. Harvey
*Assistant Examiner*—X. Chung-Trans
*Attorney, Agent, or Firm*—Robert D. Atkins

[57] ABSTRACT

A digital bus is driven to the logic state of a data input signal upon activating a data enable signal. A bus keeper enable signal activates a buffer having its input and output connected to the digital bus. The data is thus buffered and driven back onto the digital bus during the active state of the bus keeper enable signal in order to retain the logic state after the data enable signal deactivates. The bus keeper enable signal remains active until a subsequent data enable signal becomes active thereby retaining the data on the bus potentially indefinitely.

6 Claims, 2 Drawing Sheets

DIGITAL BUS DATA RETENTION

BACKGROUND OF THE INVENTION

The present invention relates in general to digital bus architectures and, more particularly, to a digital bus data retention scheme.

Most if not all computer systems use a digital bus architecture to transfer address and data signals between the central processing unit, memory and various peripherals. Typically, data is placed on the bus by a data driver. A latching circuit then latches the data at its output for use by the appropriate end device. It is important for the data to remain valid on the bus between the time the data driver charges the bus and the time the latching circuit reads the data.

A conventional digital bus may use a pre-charge transistor to initialize the bus to say logic one. The data driver then sets the proper logic level on the bus according to a data input signal. Such a scheme relies on bus capacitance to hold the data on the bus until the latch can read it. The data retention time is thus limited by the capacitive discharge time on the bus. Another known technique is to connect the input and output of a bus keeper buffer to the data bus. The buffer is typically two series inverters with a drive capacity much less than the data drivers. Thus, the data driver simply overpowers the buffer to change logic state on the bus. Unfortunately, conventional bus keeper buffers are sensitive to noise because of their small size and may change state inadvertently from noise due to adjacent bus switching.

Hence, a need exists for a data retention scheme to maintain valid data on the data bus indefinitely while remaining robust to noise.

SUMMARY OF THE INVENTION

Briefly stated, the invention comprises a digital bus comprising a data driver having an input receiving a data input signal, an enable input receiving a first enable signal, and an output coupled to the digital bus. A buffer includes an input coupled to the digital bus, and an output coupled to the digital bus. A control circuit provides a second enable signal to an enable input of the buffer which is activated during an activate state of the first enable signal.

In another aspect, the present invention is a method of retaining data on a digital bus comprising the steps of driving the digital bus to a first logic state of a data input signal upon activating a first enable signal, buffering the first logic state on the digital bus upon activating a second enable signal during an activate state of the first enable signal, and driving the first logic state back onto the digital bus during the second enable signal to retain the first logic state on the digital bus.

DETAILED DESCRIPTION OF THE PREFERRED EMBODIMENT

Figure 1:
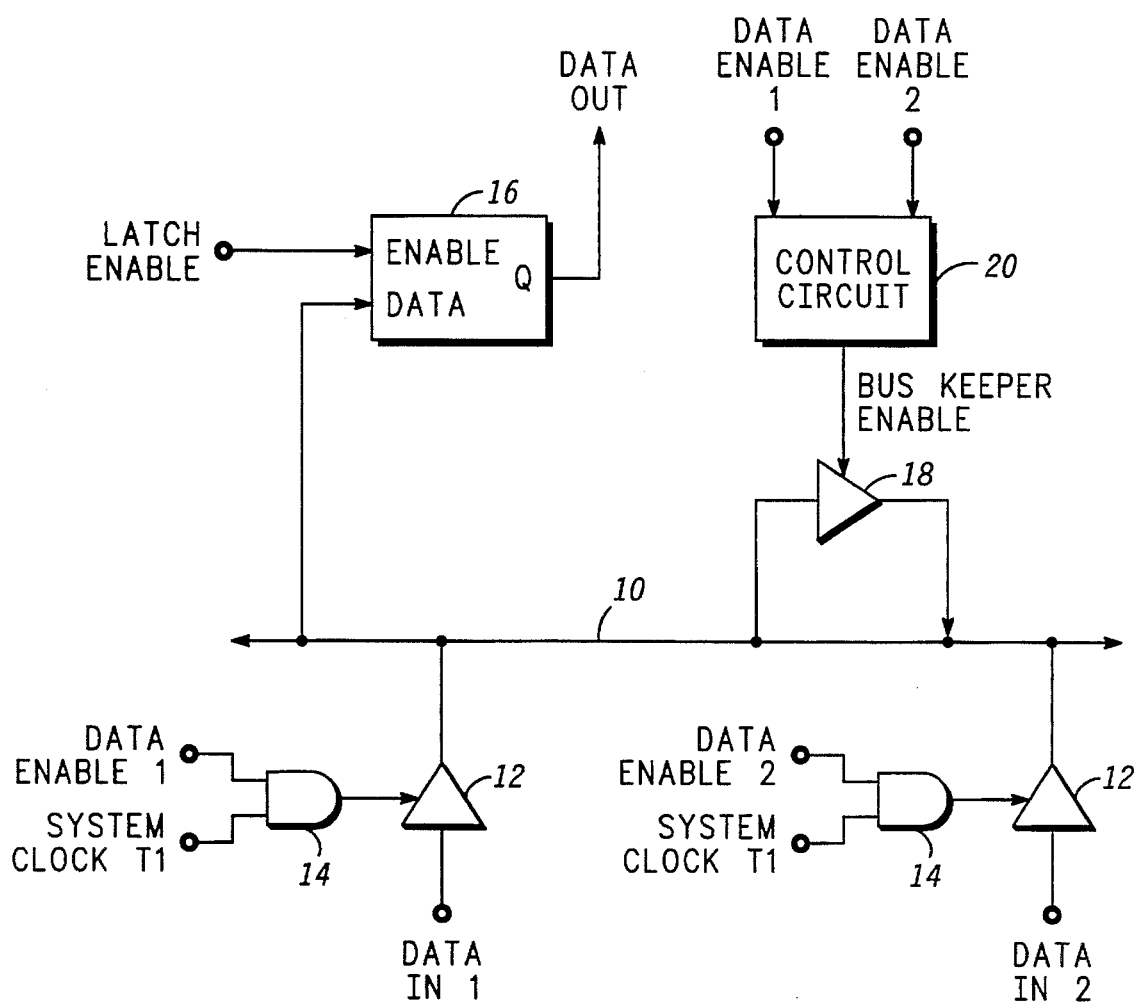
FIG. 1 is a schematic diagram illustrating a digital bus architecture with data retention scheme.

A dynamic digital bus 10 is shown in FIG. 1 suitable for manufacturing within an integrated circuit such as the Motorola 68020 and 68030 series microprocessors using conventional MOS integrated circuit processes. Digital bus 10 may represent one bit of a multi-bit data bus or address bus. Data driver 12 receives a data input signal and drives digital bus 10 upon receiving a data enable signal "anded" with a signal that is logic one during system clock T1 and T2 phases via AND gate 14. Latching circuit 16 receives data from digital bus 10 and latches data at its Q-output upon receiving a latch enable signal. Additional data drivers like 12 and latching circuit like 16 (not shown) with corresponding enable signals are typically coupled to digital bus 10. To provide data retention, a bus keeper buffer 18 has an input and output coupled to digital bus 10. Control circuit 20 provides a bus keeper enable signal to an enable input of buffer 18. Bus keeper buffer 18 may comprise two serially coupled transistor inverters (not shown) with an enable/disable feature where each drive transistor has a similar width to length ratio as the drive transistors of data driver 12. In other words, buffer 18 has substantially the same drive capacity as data driver 12. The large size of buffer 18 decreases its susceptibility to system noise. Thus, bus keeper buffer 18 acts as a data source to digital bus 10 and provides data retention after the data enable signal deactivates data driver 12.

Figure 2:
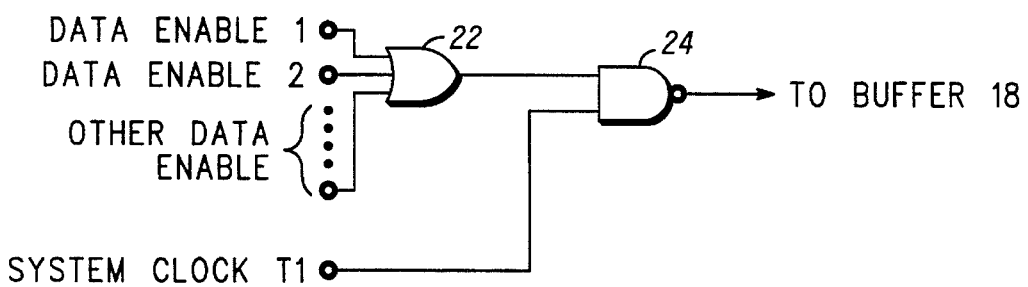
FIG. 2 is a schematic diagram illustrating the control circuit of FIG. 1.

Further detail of control circuit 20 is shown in FIG. 2 with OR gate 22 receiving the data enable signal for driver 12 and other data enable signals for drivers like 12. The output of OR gate 22 is coupled to a first input of NAND gate 24. The second input of NAND gate 24 receives the system clock T1 phase while its output provides the bus keeper enable signal to buffer 18.

Figure 3:
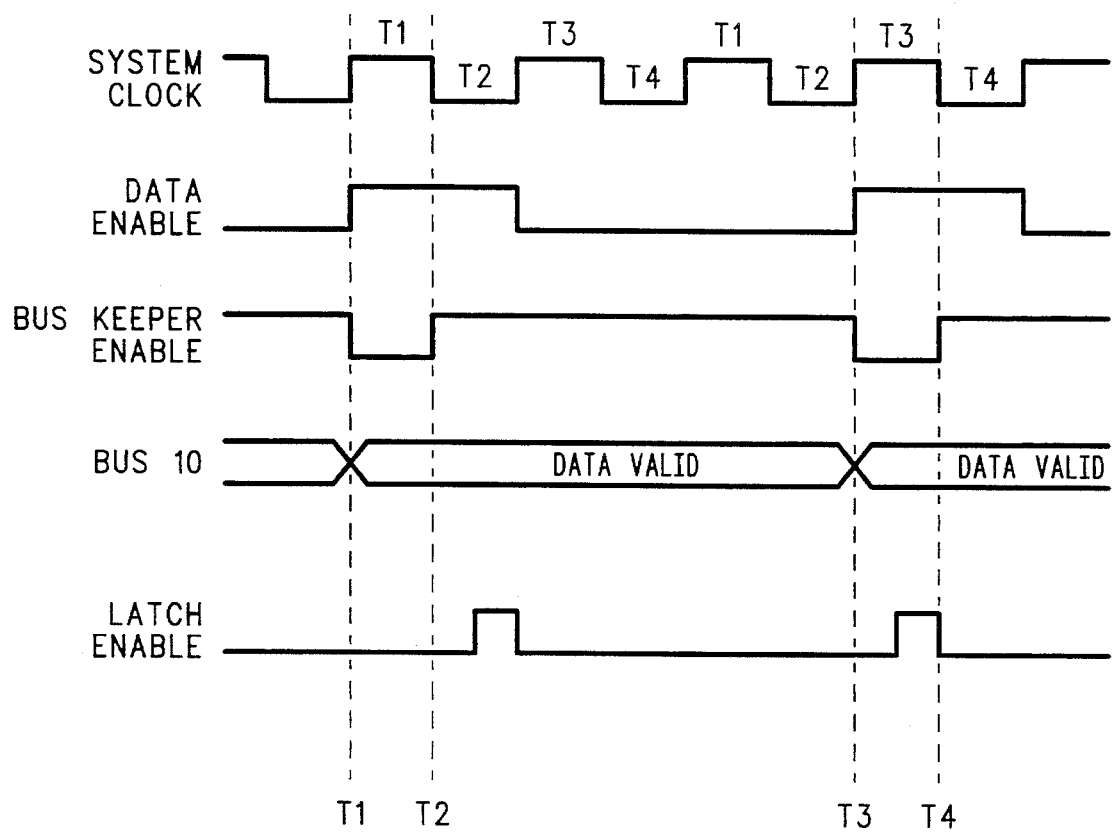
FIG. 3 is a waveform timing diagram useful in explaining the present invention.

The operation of digital bus may best be understood with the timing diagram in FIG. 3. The system clock is logically divided in four phases T1–T4 over two periods. At time $t_1$, the data enable goes active high during the rising edge of the system clock to enable data driver 12 via AND gate 14. Digital bus 10 is brought to the logic level of the data input signal. The bus keeper enable signal remains low during the time NAND gate 24 receives logic ones from OR gate 22 and the system clock T1 phase. When the system clock enters its logic zero T2 phase at time $t_2$, the bus keeper enable signal becomes active and enables buffer 18. The data enable signal remains active through time $t_2$. Bus keeper buffer 18 latches the present logic state on digital bus 10 because its input was driven to that state at time $t_1$. Thus, there is no bus contention between data driver 12 and bus keeper buffer 18. The data enable signal is removed at or before the end of the system clock T2 phase. A similar operation is shown between times $t_3$ and $t_4$ with the data enable signal keyed off the system clock T3 and T4 phases, i.e. AND gate 14 receives a logic one signal during the system clock T3 and T4 phases.

A key feature of the present invention is that data driver 12 holds the proper logic state on bus 10 during the system clock T1 and T2 phases while bus keeper buffer 18 holds the same logic state after time $t_2$. Buffer 18 buffers the present logic state on the digital bus and drives that logic state back onto the digital bus during the bus keeper enable signal to retain the logic state on the digital bus. The overlap between data driver 12 and buffer 18 during the system clock T2 phase provides immunity from system noise and assures that bus 10 is always driven by at least one source in order to prevent glitches. The data enable signal may deactivate after time $t_2$ to minimize its time on bus 10 and provide set-up time for the next data enable signal. The bus keeper enable signal remains at logic one until the next activation of a data enable signal thereby maintaining data retention potentially indefinitely. The latch enable signal may latch the data at the Q-output of latching circuit 16 any time after time $t_1$.

Digital bus 10 may be extended to systems using multiple bus segments separated by bi-directional buffers such as utilized by Motorola 68020 and 68030 microprocessors. Each bus segment will have its own bus keeper buffer 18 and control circuit 20.

While specific embodiments of the present invention have been shown and described, further modifications and improvements will occur to those skilled in the art. It is understood that the invention is not limited to the particular forms shown and it is intended for the appended claims to cover all modifications which do not depart from the spirit and scope of this invention.

What is claimed is:

1. A digital bus, comprising:
    a plurality of data drivers each having an input coupled for receiving a data signal, an enable input coupled for receiving an enable signal, and an output coupled to the digital bus;
    a buffer having an input, an output, and an enable input, said input being coupled to the digital bus, said output being coupled to the digital bus for retaining the data signal on the digital bus; and
    a control circuit providing a second enable signal to said enable input of said buffer where said second enable signal is activated during an activate state of one of said enable signals of said plurality of data drivers, said control circuit including,
        (a) an OR gate having inputs coupled for receiving said enable signals for said plurality of data drivers, and
        (b) a NAND gate having first and second inputs and an output, said first input being coupled to an output of said OR gate, said second input receiving a system clock signal, said output being coupled to said enable input of said buffer.

2. The digital bus of claim 1 further including an AND gate having first and second inputs and an output, said first input receiving said first enable signal, said second input receiving a system clock signal, said output being coupled to said enable input of said data driver.

3. The digital bus of claim 2 further including a latching circuit having a data input coupled to the digital bus, an enable input receiving a third enable signal, and an output for providing a data output signal.

4. A digital bus within an integrated microprocessor, comprising:
    a plurality of data drivers each having an input coupled for receiving a data signal, an enable input coupled for receiving an enable signal, and an output coupled to the digital bus;
    a buffer having an input, an output, and an enable input, said input being coupled to the digital bus, said output being coupled to the digital bus for retaining the data signal on the digital bus; and
    a control circuit providing a second enable signal to said enable input of said buffer where said second enable signal is activated during an activate state of one of said enable signals of said plurality of data drivers, said control circuit maintaining said second enable signal until a subsequent one of said enable signals of said plurality of data drivers, said control circuit including,
        (a) an OR gate having inputs coupled for receiving said enable signals for said plurality of data drivers, and
        (b) a NAND gate having first and second inputs and an output, said first input being coupled to an output of said OR gate, said second input receiving a system clock signal, said output being coupled to said enable input of said buffer.

5. The digital bus of claim 4 further including an AND gate having first and second inputs and an output, said first input receiving said first enable signal, said second input receiving a system clock signal, said output being coupled to said enable input of said data driver.

6. The digital bus of claim 5 further including a latching circuit having a data input coupled to the digital bus, an enable input receiving a third enable signal, and an output for providing a data output signal.

* * * * *